United States Patent [19]

Bódás et al.

[11] Patent Number: 5,324,084
[45] Date of Patent: Jun. 28, 1994

[54] PIPE CONNECTION AND METHOD OF MAKING IT

[75] Inventors: János Bódás; Gyula Kovács, both of Budapest, Hungary

[73] Assignee: Energiagazdalkodasi Reszvenytarsasag, Budapest, Hungary

[21] Appl. No.: 21,078

[22] Filed: Feb. 23, 1993

[30] Foreign Application Priority Data

Feb. 24, 1992 [HU] Hungary .................. P 9200588

[51] Int. Cl.⁵ ............................................ F16L 41/08
[52] U.S. Cl. ........................... 285/222; 285/382.5; 165/173
[58] Field of Search .............. 165/173; 285/222, 382.5

[56] References Cited

U.S. PATENT DOCUMENTS

| | | | |
|---|---|---|---|
| 1,714,703 | 5/1929 | Walton | 285/222 X |
| 2,175,412 | 10/1939 | Rodman | 285/222 |
| 3,400,755 | 9/1968 | Banta | |
| 3,446,047 | 5/1969 | Blackhall | |
| 3,778,090 | 12/1973 | Tobin | 285/222 |
| 3,787,945 | 1/1974 | Pasek et al. | 285/222 X |
| 4,627,149 | 12/1986 | Colas | |
| 4,774,505 | 5/1988 | Calleson | |
| 4,832,377 | 5/1989 | Umehara | 285/222 |
| 5,101,561 | 4/1992 | Fuhrmann et al. | 29/890.043 |

FOREIGN PATENT DOCUMENTS

| | | | |
|---|---|---|---|
| 670159 | 11/1929 | France | |
| 2185043 | 12/1973 | France | |
| 1429566 | 3/1976 | United Kingdom | 285/222 |
| 2102320 | 2/1983 | United Kingdom | |

Primary Examiner—Allen J. Flanigan
Attorney, Agent, or Firm—Young & Thompson

[57] ABSTRACT

A pipe connection comprising a tube of plastically deformable material has an expanded end section received in a hole in a tube plate with a sealing ring received in an annular seat in the hole sealing the tube to the plate. The extreme end of the tube may be deformed conically into contact with one side of the plate to provide a rigid structural joint therebetween. More than one sealing ring may be employed. Methods of making the pipe connection may involve constricting a portion of the end section to provide a space between the end portion and the tube plate hole to permit the seal to be inserted, followed by expansion of the tube end to compress the seal and engage the tube plate wall in metal-to-metal contact. Other variations of the process are disclosed.

9 Claims, 7 Drawing Sheets

PIPE CONNECTION AND METHOD OF MAKING IT

This invention relates to a pipe connection comprising a tube plate and a tube of plastically deformable material.

Pipe connections consisting of a tube plate and a tube have special significance with respect to heat exchangers widely used in heat power engineering for a heat exchange between gaseous and liquid media such as steam and water. Heat exchangers of this type consist of bundles of mutually parallel tubes which on both their ends are connected to distribution or collecting chambers. Connection is established by means of tube plates which confine the distribution or collecting chambers on their inner sides and fix the pipe bundles. The tube plates and the tubes connected thereto form pipe connections.

A pipe connection has to warrant suitable strength, should be corrosion resistant and leak-proof against fluids. Since the pipes of the heat exchangers occupy mutually close positions, building the pipe connection requires special technology. Technological difficulties such as fixing by welding are aggravated by the heat exchanger pipes consisting, as a rule, of thinner material than the tube plates receiving the pipe ends.

In case of materials of high strength and good weldability or suitable for soldering building of pipe connections represents a relatively simple problem. For instance, if both the tube plate and the tubes consist of steel, the tubes may be spinned in or welded into the tube plate. If welding is employed, differences in the wall thicknesses of tube and tube plate require special welding technology. Where materials suitable for soldering such as steel are used, the tubes are, as a rule, fixed in the tube plates by soldering or brazing. If, on the other hand, the tubes consist of soft metal, sealing between tube plate and tube is established by means of annular gaskets made of rubber or plastics. These are placed in annular seats confined on their inner side by the tube of unchanged diameter, and closed down by a plate which means assembly work as well.

The main object of the invention is a pipe connection reliably employable even in case of tubes and/or tube plates made of soft materials or combinations thereof which are hardly weldable or are not weldable at all. As an example, a case may be mentioned where both the tube and tube plate consist of aluminium or where both of them are made of metals equally unsuitable for welding and soldering. Such is the situation where e.g. copper and aluminium, steel and aluminium, or stainless steel and aluminium are combined and a reliably sealing pipe connection has to be obtained between parts made of such metals.

More particularly, the invention is concerned with a sealing connection between a tube plate and a tube in cases where pipes made of soft or plastically deformable material have to be tightly fixed in a tube plate possibly made of similar materials and there is no possibility to employ welding or soldering whereas conventional methods employing sealings made of rubber or plastic material may fail to meet required standards.

The basic idea of the invention consists in that in case of plastically deformable materials both fixing and sealing may be simply and reliably obtained by cold deformation, more particularly by expanding. As will be apparent from what is explained hereinafter, the invention represents an improvement of pipe connections comprising a tube plate and a tube in which especially the tube consists of plastically deformable material. The tube plate is provided with a hole or boring for receiving an end of the tube. The hole comprises at least one annular seat in its wall in which a sealing ring made of yielding material is inserted. The invention proper consists in that, instead of a plate closing down the seat confined on its inner side by a tube of unchanged diameter as known in the prior art, connection between tube and tube plate is, in compliance with the main feature of the invention, obtained by that the outer diameter of the tube on its section in the hole of the tube plate is greater than on its section outside the hole. Fixing of the tube in the tube plate proved to be well ensured if the outer diameter of the tube within the hole was by 6 to 7 per cent greater than that of the tube outside the hole. A metal-to-metal contact obtained thereby yielded reliable mutual fastening of connected parts. The annular seat may lie around the hole on the outer side of the tube plate in which case the seat is closed down by a radially outward bent rim of the tube rather than by a separate plate. Obviously, the former expedient ensures fixing by a metal-to-metal contact between tube and tube plate while the latter warrants reliable packing by the sealing ring being compressed by the outward bent rim of the tube so that, practically, assembly work may be dispensed with. Such structure is preferably chosen if but a single sealing ring is employed.

Preferably, the annular seat will, in axial direction of the tube, extend to one third of the thickness of the tube plate which permits both proper fixing and sealing in a convenient manner.

The axial length of the outward bent rim will preferably amount to a multiple of the wall thickness of the tube which permits reliable closing down of the seat by means of simple technology.

The outward bent rim of the tube may be conical by which manufacturing technology is simplified as will be clear to the skilled art worker.

With conical rims the angle enclosed by the conical surface of the rim and the longitudinal axis of the tube will preferably amount to 5°. In addition to closing down the seat this may already entail suitable compression of a properly selected sealing ring.

Both the tube and the hole in the tube plate may have elliptical cross-sectional areas which permits to decrease flow resistances by suitably orienting the tube with respect to the flow direction of a fluid flowing outside it as will be apparent to a person skilled in the art. Since fixing and sealing are independent of the form of tube and hole, by choosing other than circular cross-sectional areas for the latter successful employing of the invention is obviously not impaired.

On the other hand, if more than one sealing ring between tube plate and tube is employed, the sealing rings will preferably located in annular seats in the wall of the hole preferably below the outer side of the tube plate. However, a group of sealing ring may also comprise a sealing ring in an annular seat around the hole on the outer side of the tube plate as it was explained hereinbefore. An increased number of sealing rings enhances the reliability of the pipe connection since, thereby, failure of one of the sealing rings does not necessitate to dismantle a respective heat exchanger and to carry out new sealing operations. At least, in case of failure of one of the sealing rings, leakages would be a possible minimum. The employment of more than one sealing ring has special significance where several tubes or a bundle of pipes have to be built in simultaneously and a possibility of failure or a dislocation of sealing rings has to be reckoned with.

Assembly work will be considerably simplified if the sealing rings, in compliance with a further feature of the invention, form annular shoulders of a tubular member whereby sealing rings and tubular member are united to a single system. Then, obviously, but the position of the tubular member has to be taken care of rather than those of individual sealing rings.

For making a pipe connection according to the invention a per se known method may be employed in which a tube plate is provided with a hole for receiving an end of a tube, an annular seat is formed in the hole on the outer side of the tube plate, the end of the tube is placed into the hole, and a sealing ring of yielding material is put between the seat and the tube. However, fixing and sealing are obtained by expedients basically different from what is employed in the prior art. More particularly, in accordance with another main feature of the invention, the tube on its section within the hole is constricted whereby a gap is obtained between tube and tube plate, the sealing ring is put into that gap, and the tube is expanded, on the one hand, on its section within the tube plate between the inner side of the latter and the seat whereby a metal-to-metal contact is obtained between the tube and the tube plate, and, on the other hand, on its constricted section until the seat becomes closed down by an outward bent rim of the tube and, thereby, the sealing ring is compressed. As a result of such method, in the completed pipe connection the outer diameter of the tube on its section within the tube plate is greater than on its section therebelow while at least the greater part of the seat is closed by the radially outward bent rim of the tube as can simply be verified by means of an axial section of the pipe connection. The former expedient ensures reliable fixing while by the latter a suitably tight packing is obtained.

Good sealing qualities will be enhanced if the sealing ring is compressed by more than 30 per cent.

The gap between the seat and the tube end will completely be filled up and, thereby, good packing effect will be obtained if a sealing ring of circular cross-sectional area is employed the ratio between the diameter of which and the outer diameter of the tube being greater than 1/7.

Relatively simple manufacturing technology is rendered possible if the outer end of the tube is conically expanded along an axial length amounting to a multiple of the wall thickness of the tube as has been hinted at hereinbefore.

Moreover, conical expanding will preferably be continued until the angle enclosed by the obtained conical surface of the expanded tube section with the longitudinal axis of the tube reaches the value of 5° because, then, the seat becomes reliably closed down together with a suitable compression of the sealing ring.

In case of more than one sealing ring a method may be employed in which, again, a tube plate is provided with a hole for receiving an end of a tube. Then at least two annular seats are formed in the wall of the hole one of which may be at the level of the outer side of the tube plate. Sealing rings of yielding material are put into the annular seats, the tube end is introduced into the hole whereupon the tube is expanded on its section lying within the hole until a metal-to-metal contact is obtained between tube and tube plate, and the sealing rings become compressed and fill up their respective annular seats as was described hereinbefore.

The sealing rings may be fitted in annular grooves rolled in on the tube end opposite to annular seats in the wall of the hole whereupon the tube end will be expanded until a metal-to-metal contact between tube and tube plate is obtained and the sealing rings become compressed while the annular grooves on the tube end become straightened out. By such method positioning of the sealing rings is relatively more simple, and the more so if the outer diameter of the sealing rings is smaller than the diameter of the tube prior to expanding by which the sealing rings are, as it were, fixed to the tube end.

It was mentioned hereinbefore that the sealing rings may represent bulging out portions or shoulders of a tubular member with which they form a single unit or system. Then, the tubular member will be introduced between tube and tube plate with its shoulders each opposite to another of the annular seats in the wall of the hole, and the tube end expanded as already described.

The tubular member may be fitted in the hole of the tube plate directly in which case its shoulders engage the annular seats before the tube end is expanded as in case of employing individual sealing rings.

Another possibility of introducing the tubular member between tube and tube plate consists in constricting the tube end and fitting the tubular member on the constricted portion of the tube with its shoulders lying opposite to their respective annular seats in the hole of the tube plate. Thereafter, expanding is carried out as described above.

Whether individual sealing rings or a tubular member with shoulders are employed, the sealing rings or shoulders will preferably be compressed by more than 20 percent which warrants suitable packing effect.

Likewise, whether one or more sealing rings are employed, the tube will preferably be expanded on its section between the inner side of the tube plate and the seat by 6 to 7 per cent of the diameter of the tube which proved to be sufficient for good fixing.

Closer details of the invention will be described hereinafter by taking reference to the accompanying drawing the figures of which show exemplified embodiments thereof as well as some exemplified steps of the method of making it and in which.

Same reference characters refer to similar details throughout the figures of the drawing.

Figure 1:
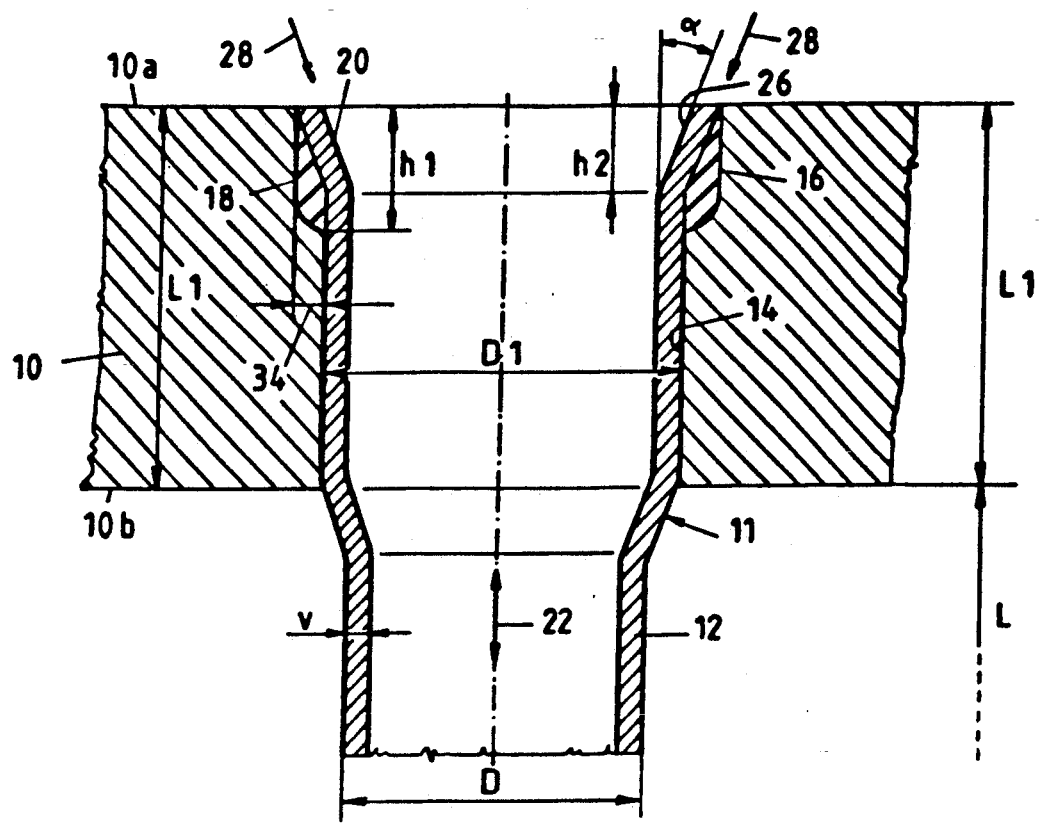
FIG. 1 illustrates a longitudinal sectional view of an exemplified embodiment of the pipe connection according to the invention.

In the drawing, reference character 10 designates a tube plate while reference character 12 refers to a tube to be connected to the tube plate 10. Tube plate 10 with tube 12 connected thereto represents a pipe connection 11.

Figure 2:
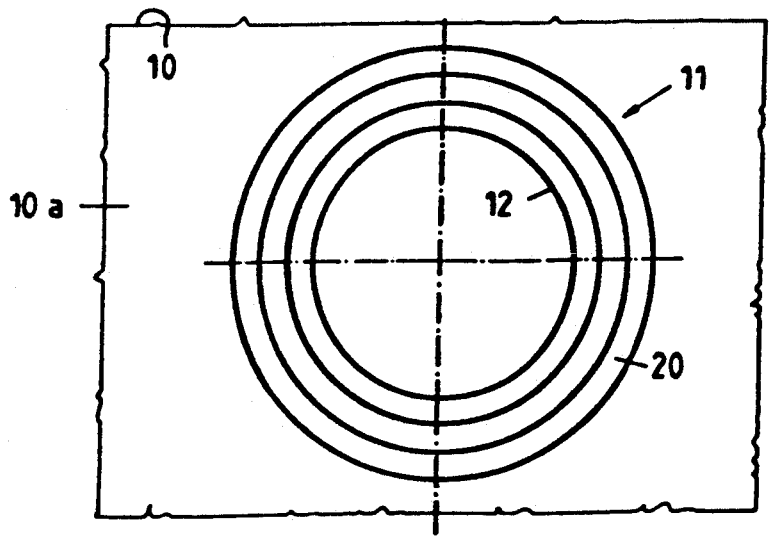
FIG. 2 is a front elevation of the pipe connection shown in FIG. 1.

As shown in FIGS. 1 and 2, the tube plate 10 is provided with a hole 14 which receives an end of the tube 12. On the outer side 10a of the tube plate 10 there is an annular seat 16 housing a sealing ring 18 made of yielding material such as rubber.

Tube 12 is made of soft that is plastically deformable material. E.g. aluminium or copper are such materials. The tube plate 10 may consist of steel or stainless steel. However, it may likewise be made of soft material such as aluminium.

In compliance with the invention, the outer diameter D1 of tube 12 along its section L1 lying within the tube plate 10 and forming one of its ends is greater than the outer diameter D on its section L below the tube plate 10. As has been mentioned, the outer diameter D1 of section L1 of tube 12 in the hole 14 is, preferably, by 6 to 7 per cent greater than the tube diameter D below the tube plate 10, that is $D1 = (1.06$ to $1.07)D$. Such dimensional ratios ensure good metal-to-metal contact and, thereby, reliable fixing of tube 12 in tube plate 10.

Figure 3:
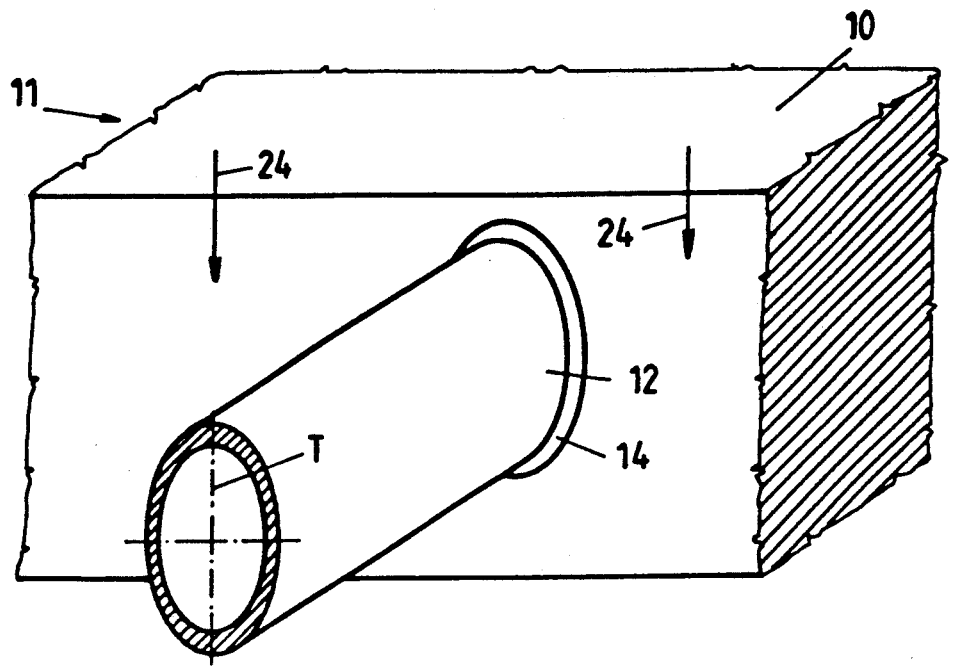
FIG. 3 represents a pipe connection according to the invention with elliptical cross-sectional areas.

Moreover, in FIGS. 1 and 2 tube 12 of pipe connection 11 has circular cross-sectional area. However, the invention can be employed also in case of tubes with other than circular cross section. E.g., the tube 12 may have elliptical shape as shown in FIG. 3. In such case, in addition to favourable results similar to those previously described also a diminution of flow resistance can be obtained if the major axis T of the tube 12 is oriented so as to lie in the flow direction 24 of fluids flowing thereoutside.

It will be seen that, in the instant case, a rim 20 of the tube 12 is outwardly bent so as to close down the seat 16 on the outer side 10a of tube plate 10.

Furthermore, the length h1 of the annular seat 16 in axial or longitudinal direction 22 of tube 12 amounts to about one third of the axial length L1 of the hole 14 in tube plate 10, that is $h1 \approx \frac{1}{3} L1$. The significance of such dimensional relations was explained in the introductory part of the specification.

The axial length h2 of the rim 20 closing down the seat 16 is, in the instant case, about the triple of the wall thickness v of the tube 12, that is $h2 = 3v$. As has been stated, by such dimensional ratios favourable possibilities to close down the seat 16 are obtained with the result of suitable compression of the sealing ring 18 and, thereby, good packing efficiency.

As illustrated in FIG. 1, rim 20 is conically bent outwardly. In connection with the angle $\alpha$ enclosed by the conical surface 26 of the rim 20 it has been pointed out that angle $\alpha$ preferably amounts to 5° because, then, practically perfect packing efficiency can be obtained if e.g. the outer diameter D and the shape and size of the sealing ring 18 are selected as described hereinafter.

As goes forth from the introduction of the specification, a method of making a pipe connection 11 according to the invention differs in its essence from conventional manufacturing methods in that expanding rather than welding or soldering and assembly work is employed. Initial steps of making such as forming a hole in the tube plate 10 for receiving a tube end, and an annular seat 16 on the outer side 10a of tube plate 10, introducing the tube end into the hole 14, and placing a sealing ring 18 in the seat 16 are known expedients with conventional methods as well.

Figure 5:
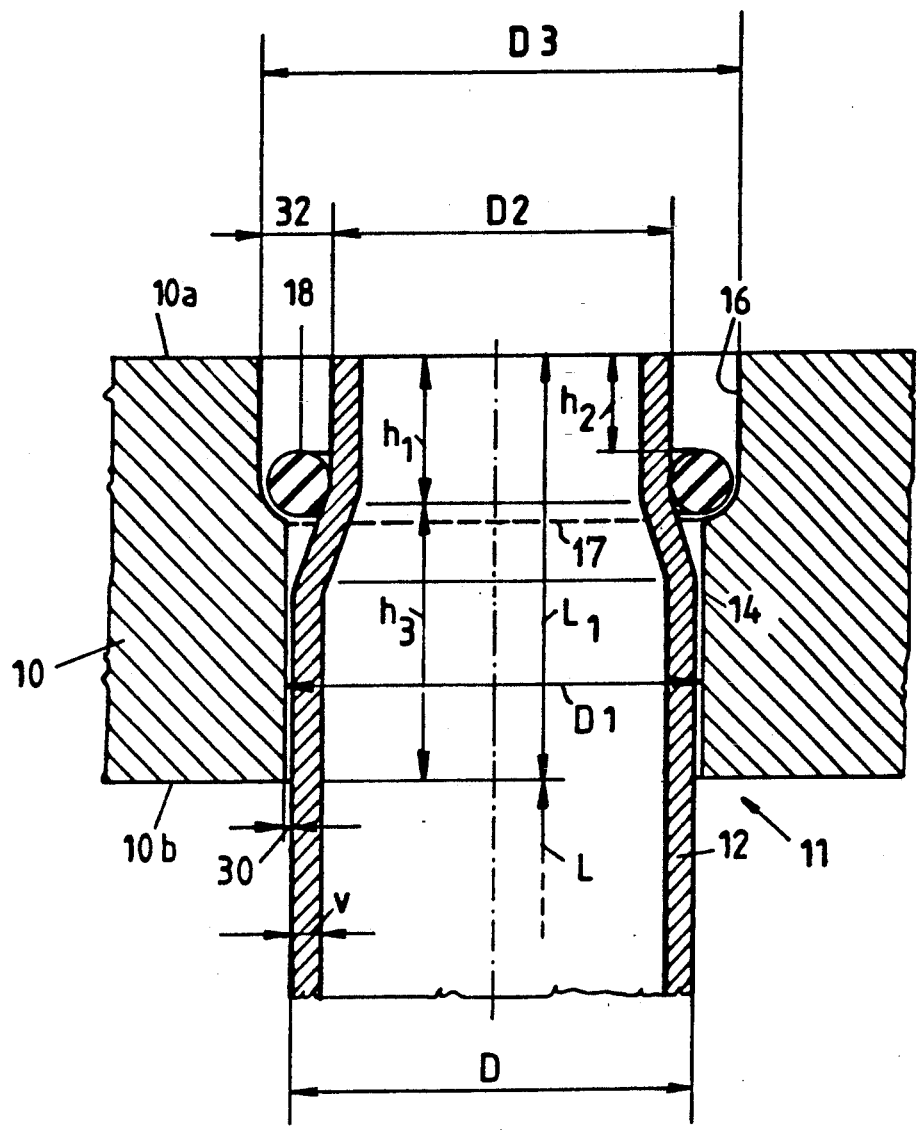
FIG. 5 shows a longitudinal sectional view of an arrangement of parts of a pipe connection according to the invention prior to expanding.

On the other hand, there are steps which are basically new with respect to such methods. In order to point out what is to be regarded as new it seems to be useful to interpret various symbols which appear in FIG. 5 showing mutual positions of parts of a pipe connection according to the invention prior to expanding once more.

Reference character L1 designates a section of tube 12 which lies within the hole 14 of tube plate 10 as a tube end in contrast to its section L therebelow. This section L1 is subdivided into an outer section h1 and an inner section h3. The outer section h1 extends from the bottom 17 of the seat 16 to the outer side 10a of tube plate 10 while the inner section h3 reaches from the inner side 10b of tube plate 10 as far as the bottom 17 of the seat 16. Reference character h2 designates a section which stretches from the outer side 10a of tube plate 10 to a length which amounts at least to a multiple such as the double or triple of the wall thickness v of tube 12.

Reference character 30 designates an annular gap between hole 14 and unexpanded tube 12.

The steps of manufacture of a pipe connection according to the invention are, first, constricting the tube end on its section h1 that is between the bottom 17 of the seat 16 and the outer side 10a of tube plate 10 and putting in the sealing ring 18 in a gap 32 of annular configuration appearing between the seat 16 and constricted tube section h1, secondly, expanding the tube section h3 that is between the inner side 10b of tube plate 10 and the bottom 17 of the seat 16 until a metal-to-metal contact is obtained between tube section h3 and tube plate 10 whereupon the annular gap 30 between tube plate 10 and tube 12 disappears, and, third, expanding tube section h2 which, in the instant case, stretches from the outer side 10a of tube plate 10 to about the double of the wall thickness v of tube until the seat 16 becomes closed down whereby sealing ring 18 is compressed.

It will be seen that by such method welding or soldering as well as assembly work to fix a tube in a tube plate are not required any more.

Preferably, dimensions will be selected so as to compress the sealing ring 18 by more than 30 per cent since, then, seat 16 is, practically, completely filled up by the sealing ring 18 as illustrated in FIG. 1.

Figure 4:
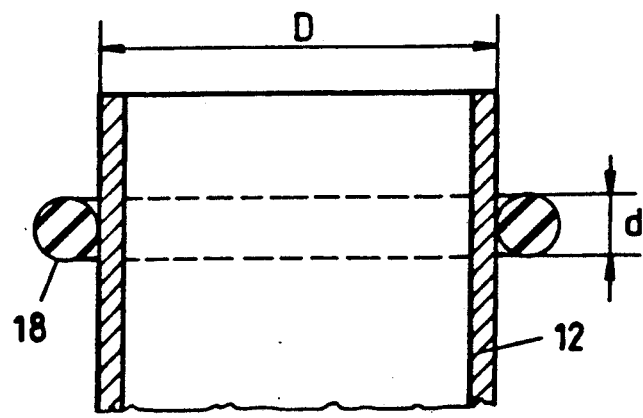
FIG. 4 illustrates an initial step of a method of making a pipe connection according to the invention.

A compression of the sealing ring 18 by 30 per cent may be obtained by employing a sealing ring 18 of circular cross-sectional area with which the ratio d/D between the diameter d of the cross-section of the sealing ring 18 and the outer diameter D of the tube 12 is greater than 1/7. Designations are indicated in FIG. 4.

Mutual arrangement of uncompressed sealing ring 18 of circular cross-section and unexpanded tube 12 is illustrated in FIG. 5 which permits to suggest practical dimensional values of an exemplified embodiment of the pipe connection according to the invention.

As shown, diameter D of unexpanded tube 12 is smaller than the diameter D1 of hole 14 so that tube plate 10 is separated from tube 12 by an annular gap 30. Let D be 18.6 millimeters and D1 be 19 millimeters which means that gap 30 amounts to 0.2 millimeter. The outer end of tube 12 is constricted to a diameter D2 of 16.5 millimeters along section h1 of 6.5 millimeters. The outer diameter D3 of seat 16 be 21.5 millimeters. Then, the width of annular gap 32 will amount to 2.5 millimeters and, consequently, the diameter of sealing ring 18 will have the same value. The wall thickness v of tube 12 be 0.75 millimeter while, as has been mentioned, the axial length (section h1) of seat 16 is 6.5 millimeters. Then, the axial length of section h2 amounts to 4 millimeters which is about the triple that is a multiple of the wall thickness v. The axial dimension of section L1 of tube plate 10 be 18 millimeters which means that, in axial direction, the seat 16 extends to about one third of the thickness L1 of tube plate 10. The sealing ring 18 of a diameter of 2.5 millimeters be compressed to a width 34 (FIG. 1) of 1.25 millimeters which means a compression by more than 30%.

In the instant case, section h2 of tube 12 stretching inwardly from the outer side 10a of tube plate 10 to about the triple of the wall thickness v of tube 12 will be expanded conically, preferably, until the angle $\alpha$ enclosed by the surface 26 of the obtained cone with axial direction 22 of tube 12 reaches the value of 5° whereby both the seat 16 is reliably closed down and the sealing ring 18 is compressed so as to completely fill up the seat 16. Such technological parameters permit simple control of manufacture.

Figure 6:
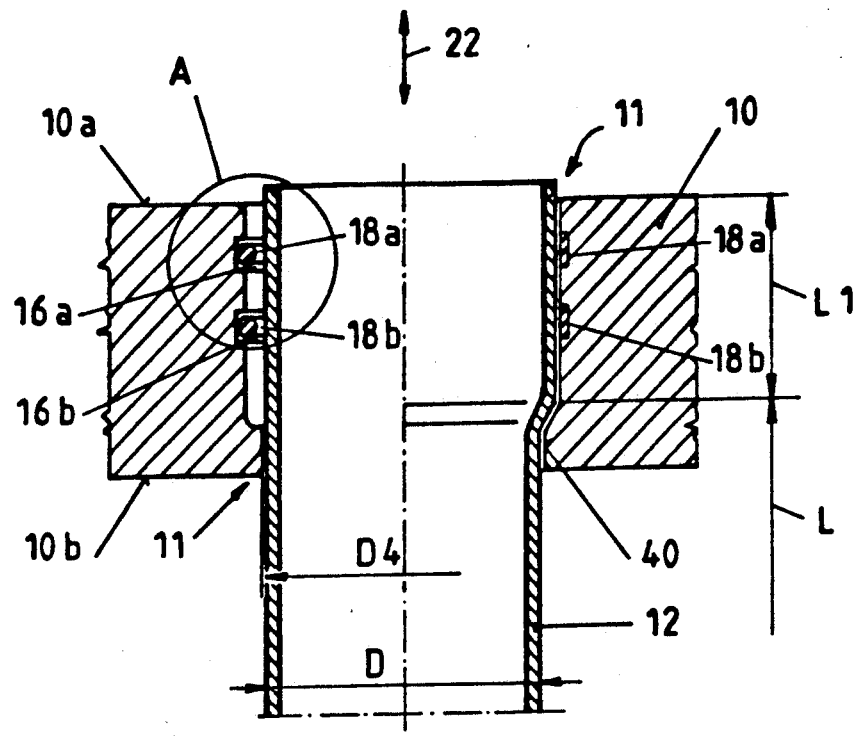
FIG. 6 is a longitudinal sectional view of a further embodiment of the invention where more than one sealing ring is employed.
Figure 7:
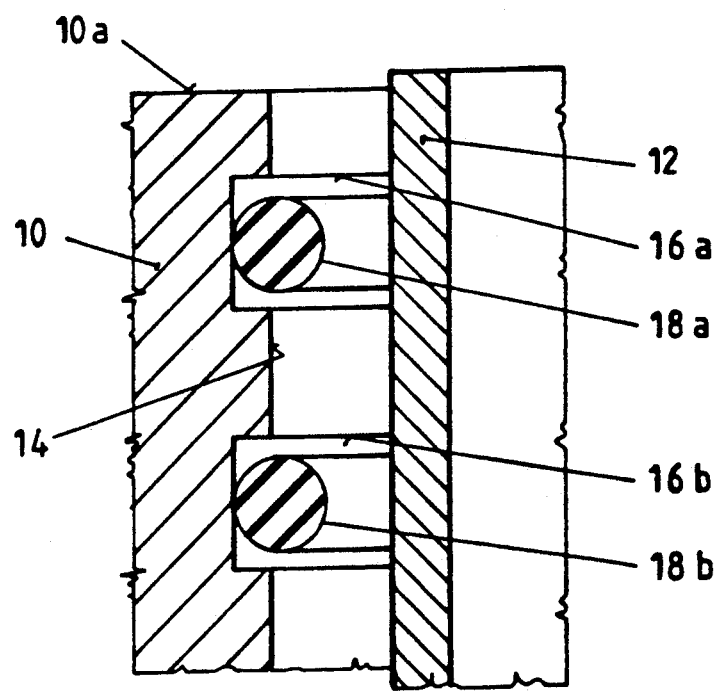
FIG. 7 shows an encircled part A of FIG. 6 at an enlarged scale.

The embodiment shown in FIGS. 6 and 7 differs from the previous one in that it comprises more than one sealing ring. More particularly, it has two sealing rings 18a and 18b which both lie below the outer side 10a of tube plate 10 in the hole 14. Consequently, there are two annular seats 16a and 16b in the hole 14 for the sealing rings 18a and 18b, respectively. The tube end L1 is introduced into hole 14 without constriction and expanded as described hereinbefore. As a result, the sealing rings 18a and 18b are compressed and fill up their respective annular seats 16a and 16b as shown on the right hand part of FIG. 6. At the same time a metal-to-metal contact is obtained between tube plate 10 and tube 12 above, between and below the annular seats 16a and 16b ensuring reliable fixing of tube end L1 in tube plate 10.

Figure 8:
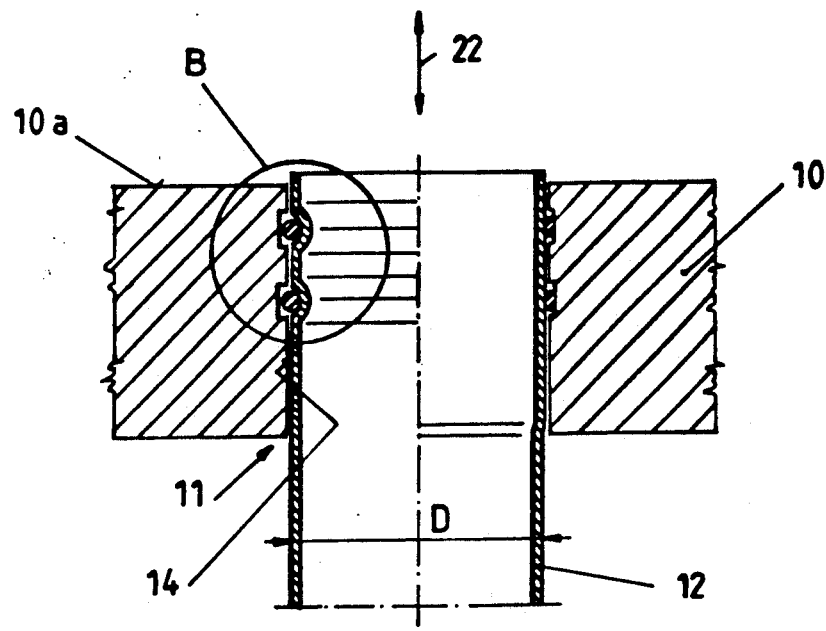
FIG. 8 represents a longitudinal sectional view of a still further embodiment of the invention with more than one sealing ring.
Figure 9:
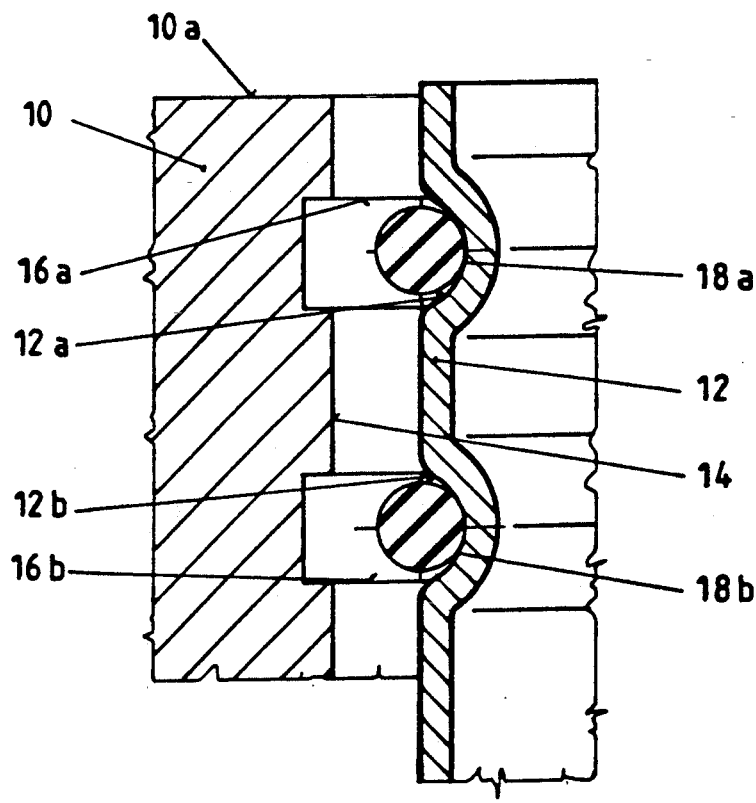
FIG. 9 is an enlarged view of a part B of FIG. 8 delimited by a circle.

In case of the embodiment illustrated in FIGS. 8 and 9 sealing rings 18a and 18b are placed in annular grooves 12a and 12b rolled in on tube end L1 opposite to annular seats 16a and 16b, respectively. After expanding compression of the sealing rings 18a and 18b as well as a metal-to-metal contact between tube plate 10 and tube 12 is again obtained as in the case described previously. In addition, grooves 12a and 12b are straightened out as can be seen on the right hand part of FIG. 8.

Handling of the tube 12 with the sealing rings 18a and 18b in its annular grooves 12a and 12b, respectively, is facilitated if the inner diameter of the rings 18a and 18b is smaller than the diameter D of tube 12 prior to expanding because, then, the sealing rings 18a and 18b become stretched when put on tube end L1 and snugly fit in the annular grooves 12a and 12b, respectively, of the latter.

Figure 10:
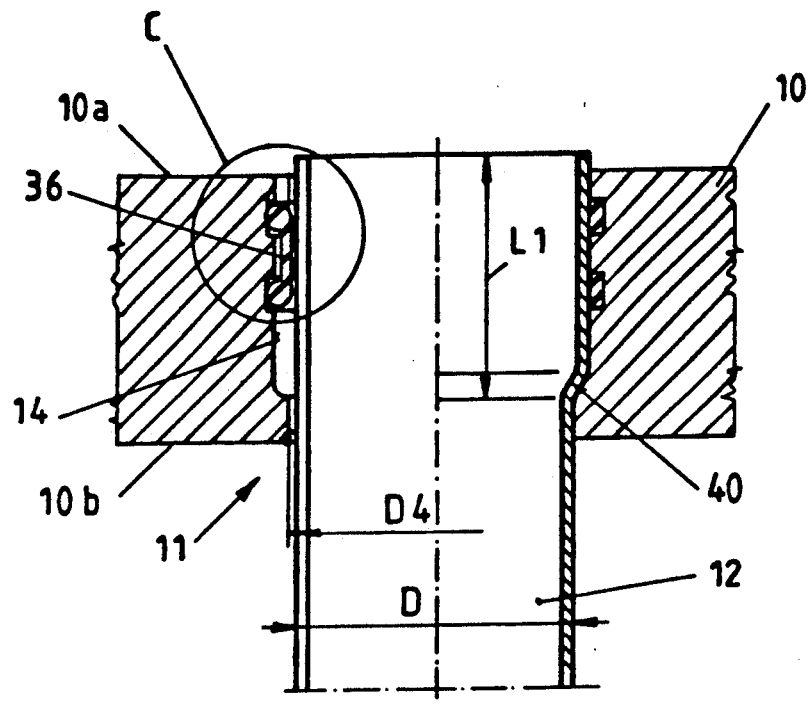
FIG. 10 illustrates still another embodiment of the invention in longitudinal sectional view where the sealing rings are bulging parts of a common tubular member.
Figure 11:
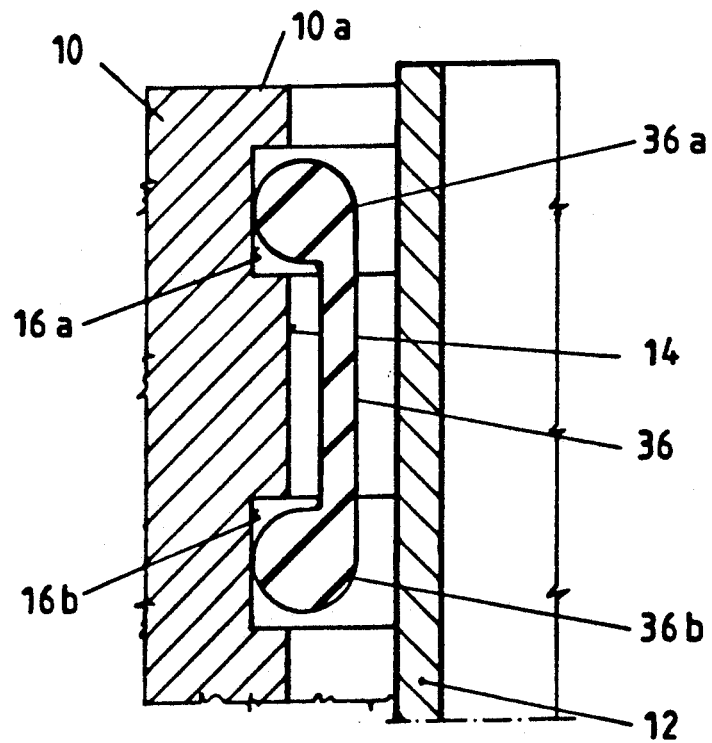
FIG. 11 shows an encircled part C of FIG. 10 at an enlarged scale.

FIGS. 10 and 11 show an embodiment where the sealing rings form bulging parts in the form of shoulders 36a and 36b of a tubular member 36 opposite to annular seats 16a and 16b, respectively, in hole 14 of tube plate 10. After expanding, tube end L1 and tubular member 36 occupy positions as illustrated in the right hand part of FIG. 10. It will be seen that, again, the annular seats 16a and 16b are filled up by the compressed shoulders 36a and 36b, respectively, of tubular member 36 above and below of which a metal-to-metal contact is established between tube plate 10 and tube 12 with the result of reliable fastening and sealing.

Figure 12:
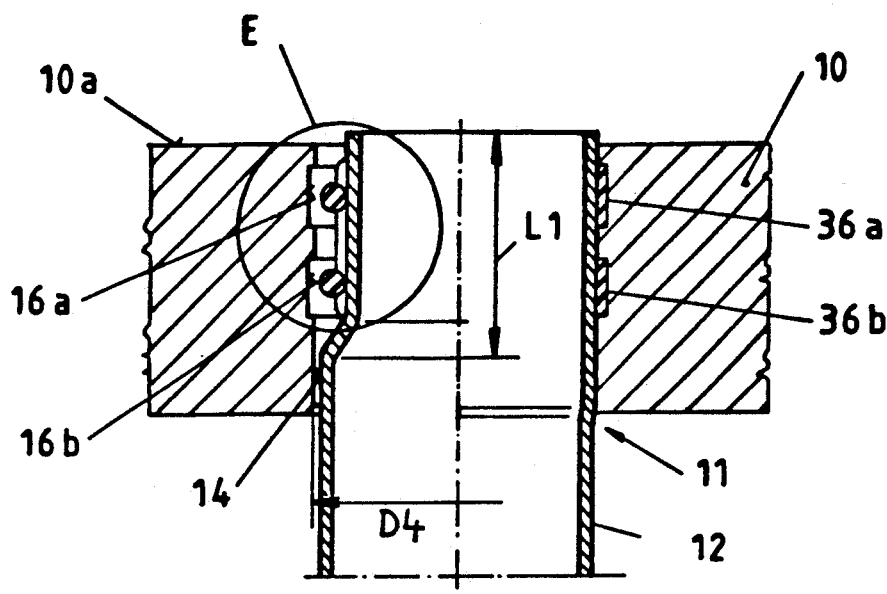
FIG. 12 represents a longitudinal sectional view of a still further embodiment of the invention with a tubular member carrying shoulders for sealing rings.
Figure 13:
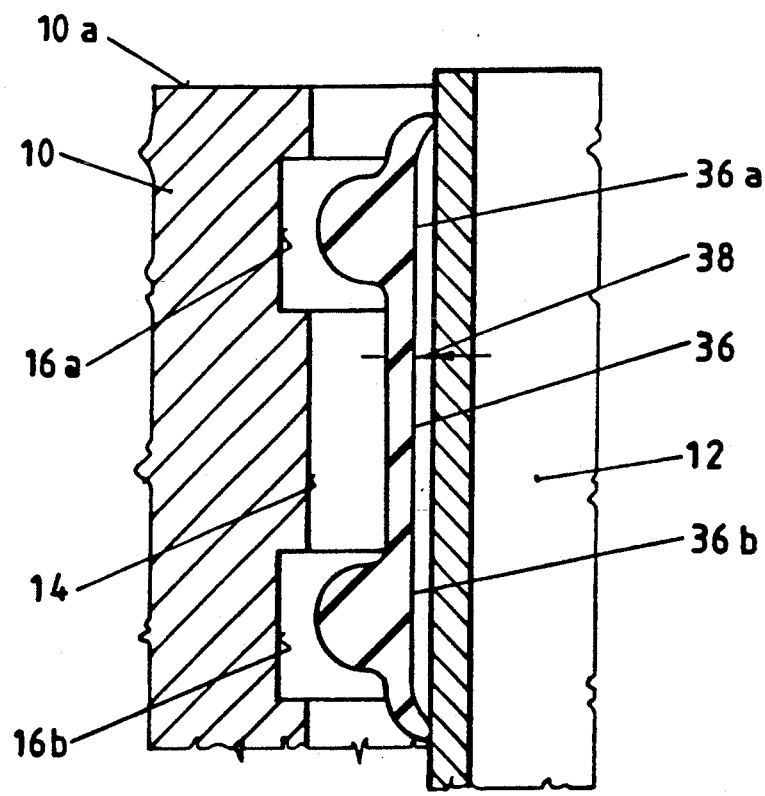
FIG. 13 is an enlarged view of an encircled part E of FIG. 12.

The embodiment represented in FIGS. 12 and 13 differs from the previous one in that the tubular member 36 is, prior to expanding, engaged with the tube end L1 rather than with the annular seats 16a and 16b in the hole 14. For such purpose, the tube end L1 is, first, constricted as shown in the left hand part of FIG. 12. Then, the tubular member 36 is pushed on the constricted tube end L1 so that its bulging parts or shoulders 36a and 36b lie opposite to the annular seats 16a and 16b, respectively. A narrow annular gap 38 left between tubular member 36 and the constricted part or tube end L1 of tube 12 facilities such operation. Thereafter, expanding is carried out the result of which are, on the one hand, compression of shoulders 36a and 36b and, on the other hand, a metal-to-metal contact between tube 12 and tube plate 10 above and below the tubular member 36 as described hereinbefore. Thus, the tube end L1 is again suitably fastened and sealed in tube plate 10 which is the main object of the present invention.

Obviously, more than two sealing rings may be provided for in a similar manner. Moreover, a number of tubes such as a pipe bundle may be fastened and sealed in the above described manner simultaneously as will be apparent to a skilled art worker.

As to practical values of some dimensions, the original or unexpanded tube diameter D may amount to 18.6 millimeters while diameter D1 of the hole 14 will be 21 millimeters in case of embodiments shown in FIGS. 6 and 7, 19 millimeters in that of the embodiment illustrated in FIGS. 8 and 9 as well as in FIGS. 12 and 13, and 22 millimeters in case of the embodiment represented in FIGS. 10 and 11. The axial length and the depth of the annular seats 16a and 16b may amount to 2 millimeters and to 0.5 millimeter, respectively, while sealing rings 18a and 18b will have a diameter of 1 millimeter. The extension of tubular member 36 in radial direction will amount to 1.5 millimeters while its wall thickness is 0.5 millimeter (FIGS. 10 and 11). The annular gap 38 (FIG. 13) between tubular member 36 and tube 12 may be of 0.5 millimeter while the tube end L1 is constricted to a diameter of 15 millimeters (FIG. 12). Where the hole 14 has shoulders 40 at the inner side 10b of tube plate 10 as in case of the embodiments shown in FIGS. 6 and 10 which may facilitate assembly work its diameter D4 will amount to 19 millimeters.

Expanding is preferably carried out by means of rolling mills for pipes or tubes well known in heat exchanger technology. Due to spinning in the tube end lying in the tube plate 10, that is section L1 of tube 12 becomes expanded. Thereby, on the one hand, tube 12 becomes mechanically fastened in tube plate 10 and, on the other hand, the sealing ring or rings become flattened.

As will be apparent, due to structural features and spinning in technology according to the invention the sealing rings in seats such as seat 16 or seats 16a and 16b between tube plate 10 and tube 12 are considerably deformed and put under pressure whereby very tight packing effect is obtained. Hydrostatic pressure of fluids flowing in tubes 12 works in the direction of arrows 28 shown in FIG. 1. Thus, in case of embodiments like that pressure increases of the fluid favour such effect since, then, forces pressing a sealing ring 18 on its exposed front surface on the outer side 10a of tube plate 10 into its seat 16 are relatively higher.

We claim:

1. A pipe connection comprising a tube plate (10) and a tube (12) of plastically deformable material, a hole (14) in the tube plate (10) for receiving an end of the tube (12), at least one annular seat (16) in the wall of the hole (14), and a sealing ring (18) of yielding material in the seat (16), characterized in that the outer diameter (D1) of the tube (12) on its section (L1) lying in the hole (14) of the tube plate (10) is greater than the outer diameter (D) on its section (L) being outside the hole (14), there being more than one sealing ring (18a, 18b) between the tube plate (10) and the tube (12), at least one of the sealing rings (18a, 18b) being inserted in an annular seat (16a, 16b) in the wall of the hole (14) below the outer side (10a) of the tube plate (FIG. 6.).

2. The pipe connection as claimed in claim 1, characterized in that the outer diameter (D1) of the tube (12) within the hole (14) is by 6 to 7 per cent greater than its outer diameter (D) outside the hole (14).

3. The pipe connection as claimed in claim 1, characterized in that the annular seat (16) lies around the hole (14) on the outer side (10a) of the tube plate (10), and the seat (16) is closed at least partly by a radially outward bent rim (20) of the tube (12) (FIG. 1).

4. The pipe connection as claimed in claim 3, characterized in that, in axial direction (22) of the tube (12), the annular seat (16) extends to one third of the thickness (L1) of the tube plate (10).

5. The pipe connection as claimed in claim 3, characterized in that the axial length (h2) of the rim (20) amounts to a multiple of the wall thickness (v) of the tube (12).

6. The pipe connection as claimed in claim 3, characterized in that the rim (20) of the tube (12) is conical.

7. The pipe connection as claimed in claim 6, characterized in that the angle ($\alpha$) enclosed by the conical surface (26) of the rim (20) with the longitudinal axis (22) of the tube (12) amounts to 5°.

8. The pipe connection as claimed in claim 1, characterized in that the sealing rings (16a, 16b) form annular shoulders (36a, 36b) of a tubular member (36) whereby sealing rings and tubular member are united to a single system (36a, 36b, 36) (FIG. 10).

9. The pipe connection as claimed in claim 1, characterized in that both the tube (12) and the hole (14) in the tube plate (10) have elliptical cross-sectional areas.

* * * * *